C. L. NELSON.
CASH REGISTER INDICATOR.
APPLICATION FILED JAN. 15, 1914.

1,156,091.

Patented Oct. 12, 1915.
8 SHEETS—SHEET 1.

Fig. 1.

Witnesses
C. Klosterman
Carl Beust

Inventor
Carl L. Nelson
by R. C. Isham
Chester H. Braselton
Attorneys

C. L. NELSON.
CASH REGISTER INDICATOR.
APPLICATION FILED JAN. 15, 1914.

1,156,091.

Patented Oct. 12, 1915.
8 SHEETS—SHEET 4.

UNITED STATES PATENT OFFICE.

CARL L. NELSON, OF SEATTLE, WASHINGTON, ASSIGNOR TO THE NATIONAL CASH REGISTER COMPANY, OF DAYTON, OHIO, A CORPORATION OF OHIO, (INCORPORATED IN 1906.)

CASH-REGISTER INDICATOR.

1,156,091.　　Specification of Letters Patent.　　Patented Oct. 12, 1915.

Original application filed June 10, 1905, Serial No. 264,610. Divided and this application filed January 15, 1914. Serial No. 812,269.

*To all whom it may concern:*

Be it known that I, CARL L. NELSON, a citizen of the United States, residing at Seattle, in the county of King and State of Washington, have invented certain new and useful Improvements in Cash-Register Indicators, of which I declare the following to be a full, clear, and exact description.

This invention has for its principal objects the improvement and simplification of cash registers and provision thereof with means for accomplishing certain new results.

More specifically the objects of the invention include, among others which will appear below, the provision of an automatic drawer-operated machine with means for not only registering the amount of the purchase or transaction in such a manner as to show figures which can be read from both sides of the machine on account of transparent indicators, but also for presenting these figures in their normal position instead of that which is usually a feature of cash registers. All the patentable subject matter disclosed in this application is not claimed herein however, as this represents one division of the original application filed June 10, 1905, Serial No. 264,610 and is intended to embody claims only to the indicating mechanism of the invention. Another divisional application is also being filed in which it is intended to embody the claims to the drawer operating mechanism of the invention.

Reference is to be had to the accompanying drawings forming a part of this specification, in which similar characters of reference indicate corresponding parts in all the figures.

Of said drawings; Fig. 4ª is a detail top view of a part of the mechanism shown in Fig. 4. Fig. 5ª is an enlarged detail of the drawer connections.

Figure 1:
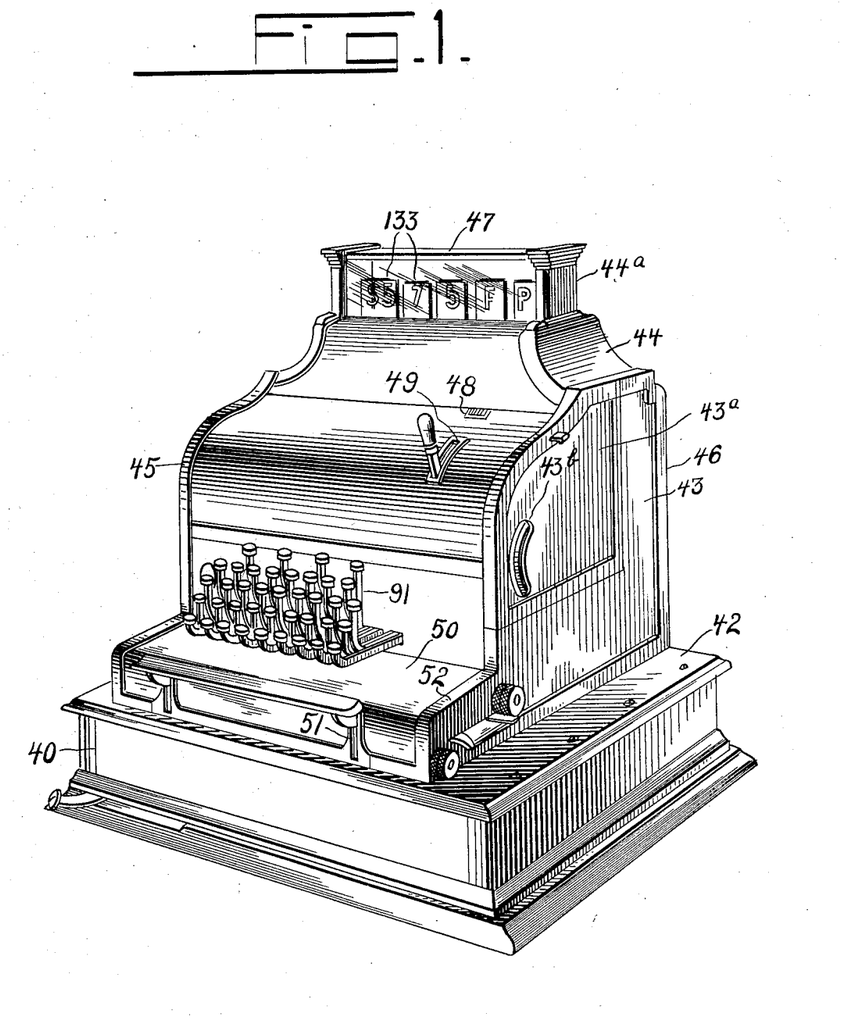
Figure 1 is a perspective view of a cash register embodying the present improvements.

The entire machine is mounted on a base 40 provided with a suitable top or table. The table is provided with a cover 42 (Fig. 1) which is removable from the table and supports the various parts of the frame or casing. The casing itself is shown as consisting of several parts forming ends 43, a top 44, a front side 45, and a rear side 46. One end 43 is provided with a removable panel 43ª having a slot 43ᵇ for a purpose to be described. The top is provided with an extension 44ª, having transparent walls and top 47. The front may be made in several pieces and is provided with a slot 48 for viewing a counter, and with a second slot 49 for a printing lever. In the front of the machine is located a small casing 50, which can be readily removed, and which is provided with openings 51 and 52 in its front and end walls respectively. Within the casing are a pair of longitudinal side-walls 53 (Fig. 2) having numerous passages and openings for receiving the various parts of the mechanism, and for supporting them. There are several other details which constitute a part of the frame, and which will be referred to in a description of the elements with which they are connected.

*Drawer operating mechanism.*—The base 40 is hollow (see Fig. 4) and is provided with a drawer 54 which is preferably provided with compartments 55, and has a plate 56 mounted at its rear end. Above the drawer the table is provided with a plate 57 for supporting part of the operating mechanism for the drawer. Upon this plate is mounted a lever 58 (Fig. 7) the latter being pivoted to the plate by means of a pin 59. This lever is connected, by means of a chain 60 or other flexible connection passing around a pulley 61, with the drawer. This chain is shown as being connected with a hook 62 mounted on a bracket 63 mounted upon the plate 56 (Fig. 5ª). A spring 64 mounted on the plate 57 normally pulls the lever away from the pulley 61 and constantly exerts a motive force for opening the drawer. At the beginning of the motion of opening the drawer it is retarded by the bearing of a roller 65 on a short arm 66 of the lever 58 against a cam surface 67 on a bar 68. The purpose of this is to avoid the rapid motion which would be given to the drawer by the motor spring 64, and to permit the drawer to close with a sharp motion at the end of the stroke. The bar 68 is connected (see Fig. 3) to a pair of slides 69 movable on the plate 57, and it is normally forced toward the roller 65 by means of a motor spring 70, which although acting to produce motion in the same direction as the spring 64, is designed especially for another office which will be described below. The motion of the bar 68 is kept in a straight line by means of the slides 69, as they are constrained to move in parallel lines by the end-pieces 53 of the frame against which they are placed, and by a projection 69ª (Fig. 7) moving in a slot 57ª.

Figure 5:
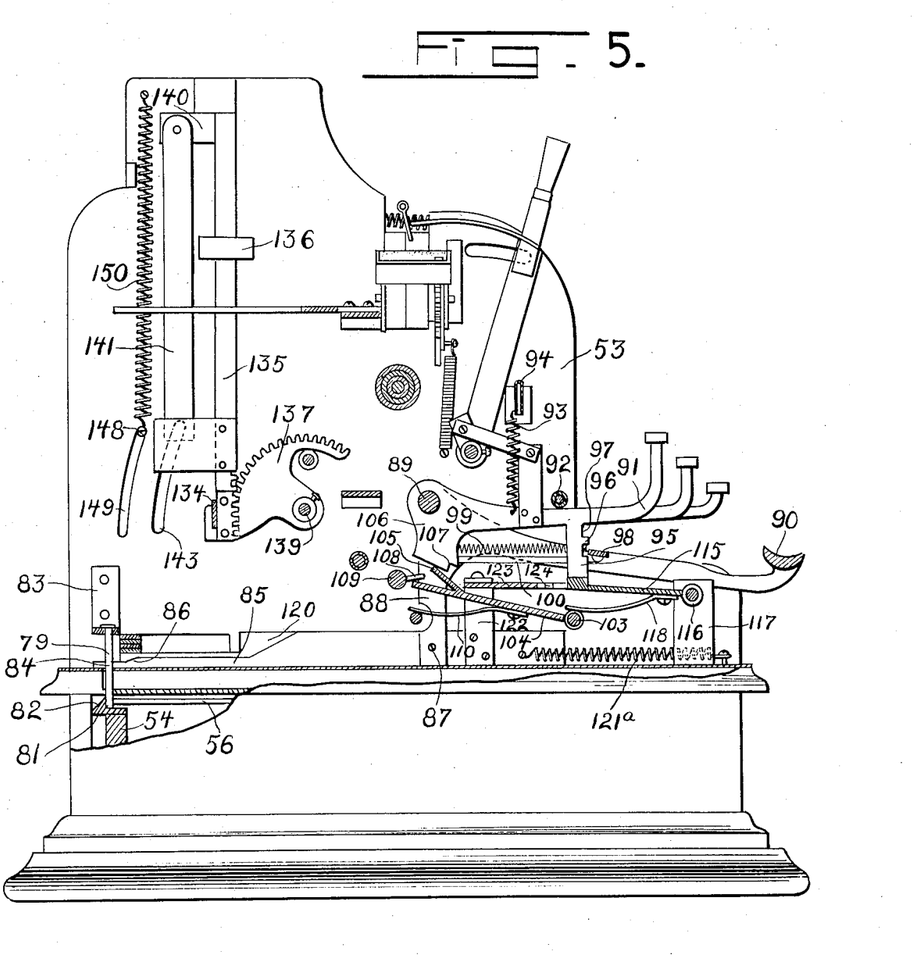
Fig. 5 is a sectional view on the line 7—7 of Fig. 2.
Figure 5A:
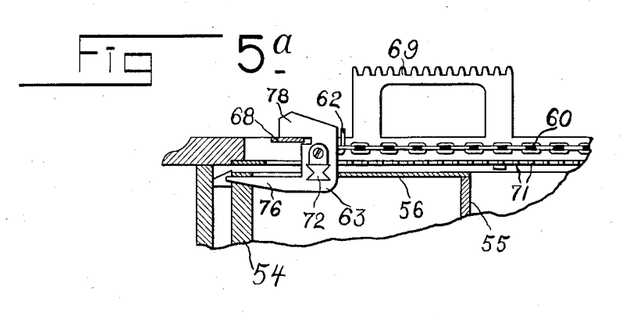

The plate 57 is provided with a rack 71 (Fig. 7) along which the bracket 63 passes. In order to prevent the drawer from being partly opened or closed and the motion stopped without completing it, this bracket is provided with a hanging pawl 72 (Fig. 5ª). This pawl is pivoted at a point well above its center of gravity, and on the lower part is provided with two notches 73 (Fig. 5ª) having oppositely extending teeth 74 below them. As the pawl passes over the rack in either direction it will be forced to the rear with respect to the direction of motion, and one of the teeth 74 passing along the top of the rack will be at all times in a position to engage the rack and stop the drawer if it is attempted to move it in the other direction. When the end of the rack is reached, however, the pawl is permitted to drop from it so that upon reversing the motion of the drawer the same conditions are repeated. The plate 57 is provided with a slot 75 for receiving the pawl and the bracket 63. The bracket 63 is provided (Fig. 7) with a projection 76 extending to the rear, and a projection 77 extending to the side and by which it is guided below the cover plate 57. It is also provided with a cam surface 78 which projects through the slot 75 and engages certain mechanism which will be described below. The plate 57 has a slot 57ᵇ through which the projection 77 can be inserted. The mechanism just above described is more clearly shown and described in the original application hereinbefore referred to and reference may be had to the same for a more detailed showing and description of the same.

Figure 7:
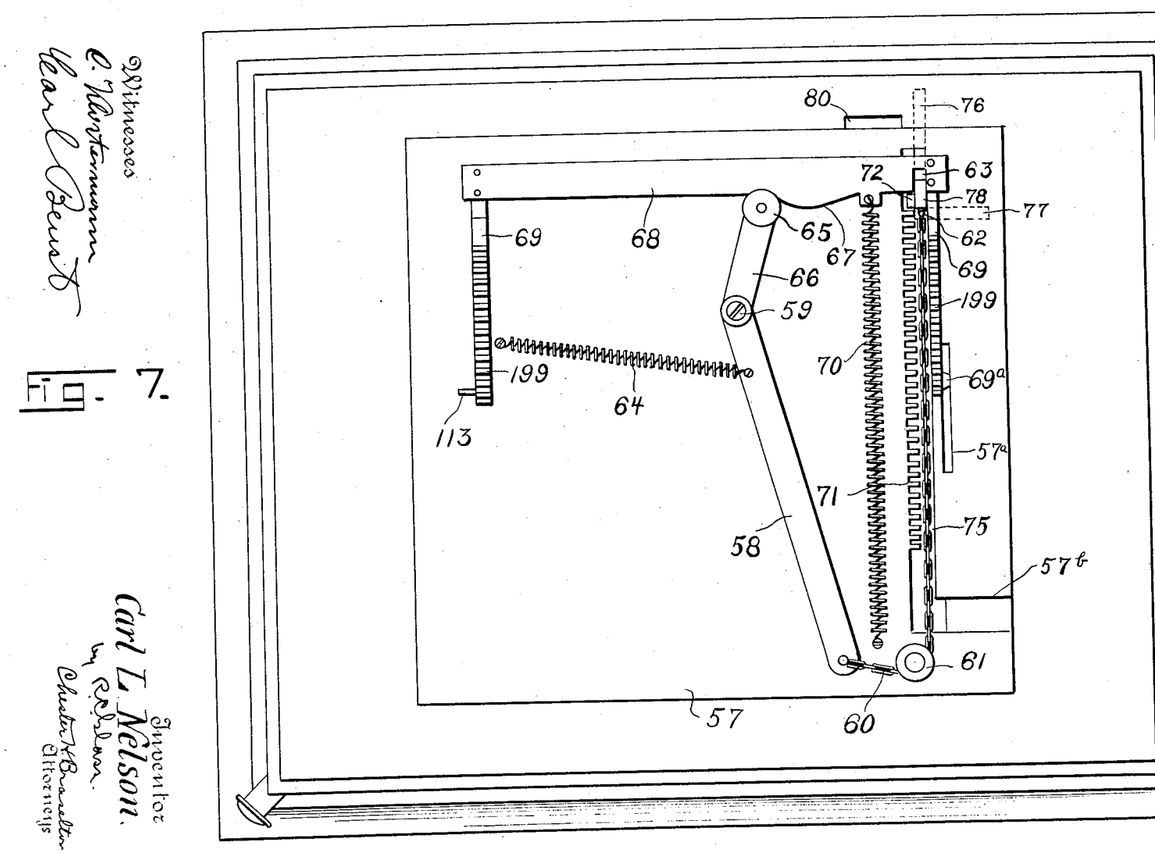
Fig. 7 is a plan of the table on which the machine is supported.

From the construction so far described, it will be seen that the opening of the drawer by the operation of the spring 64 causes the bar 68 to move to the front in Fig. 7 a certain distance, taking with it the slides 69; also that the bracket 63 is simultaneously caused to move with the drawer throughout the length of the slot 75, carrying with it the pawl 72, the latter passing over the rack 71 and preventing the movement of the drawer in the wrong direction. It will also be seen that the drawer is compelled to start to open with a slow motion, and that after the start is made the motion will increase, according to the natural acceleration of speed due to the spring 64, while in closing, the drawer can be forced back against the resistance of the spring, and at the end of the stroke it can easily be moved to its extreme position.

*Drawer locking and releasing device.*—In closed position the drawer is intended to be held by the operation of a pin 79 (Fig. 5) passing through a slot 80 in the table, and normally dropping by gravity in front of a projection 81 on the drawer. This projection has a slanting surface 82 at the rear in order to assist in forcing the pin up when the drawer is closed, and assure that it will reach the top of the incline and fall behind the projection. This pin therefore automatically locks the drawer in closed position when it is forced to the end of its stroke, and it must be displaced before the drawer can be opened. In order to accomplish this result the pin extends upwardly some distance from the top of the table, and is provided with a guide 83. It is also provided with a passage or notch 84 through which passes the end of a bar 85 (Fig. 5). This bar is provided with a slanting or cam surface 86, which upon being moved to the rear will engage the top of the slot 84 and lift the pin. For the purpose of moving this bar it is pivotally connected by a bolt or pin 87 with a bell crank 88, which is pivoted upon a shaft 89 passing through the machine from one end frame 53 to the other. This bell-crank is duplicated at the two ends of the machine, the two parts of it being connected by an operating bar 90. This operating bar preferably extends across the front of the machine so that it will be within easy reach of an operator at all times. Obviously the depression of the operating bar causes the reciprocation of the bar 85 to the rear, and the engagement of the surface 86 with the pin 79 so as to raise the latter and allow the drawer to be opened by the mechanism described.

*Keys and key-locking mechanism.*—On the shaft 89 are also pivoted several sets of key-bars 91 (Fig. 5). Each key-bar is normally held in elevated position against a rod 92 by means of a spring 93 connected with a bar 94 passing across the machine. Each key is also provided with a projection 95 extending below and having a tooth 96 upon one side thereof thereby providing two spaces 97. On one arm of each bell crank 88 is slidingly mounted a cross-bar 98 which is adapted to enter the spaces 97 and lock the keys in their raised or depressed position. This bar is normally forced under tension by a spring 99 into said spaces, but under certain conditions it is held away from the projection 95 by means of a bar 100 mounted upon each of the bell cranks. This bar is held in a depression in the bell crank and is rigidly connected with the bar 98 so that it prevents the latter from yielding to the spring 99 beyond a certain point. When the operating bar is depressed, the short arm of the bell crank moves to the rear of the shaft 89 and permits the bar 98 to move inwardly with it, but when the operating bar is raised the rod 100 being forced to the front by the short arm of the bell crank holds the bar in a position toward the front where it will not engage in the spaces 97. This motion is permitted on account of the fact that the bar 98 can slide in slots on the two end frames 53. When this bar is in the position shown in Fig. 5, the keys can be depressed and raised at will, but when the operating bar is lowered the cross-bar will move into the spaces which are opposite it and lock all the keys, either in depressed or raised position, according to their condition.

Figure 2:
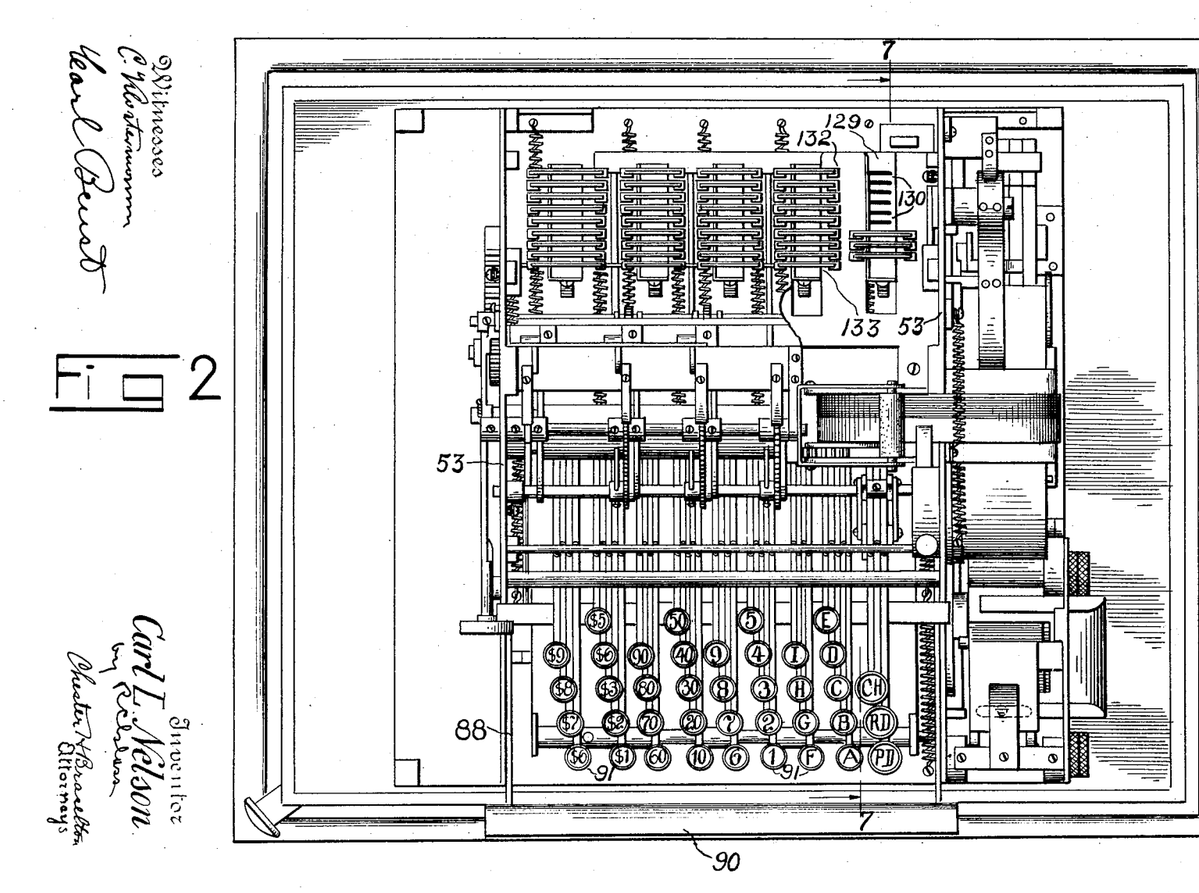
Fig. 2 is a plan of the same with the covering frame removed.
Figure 6:
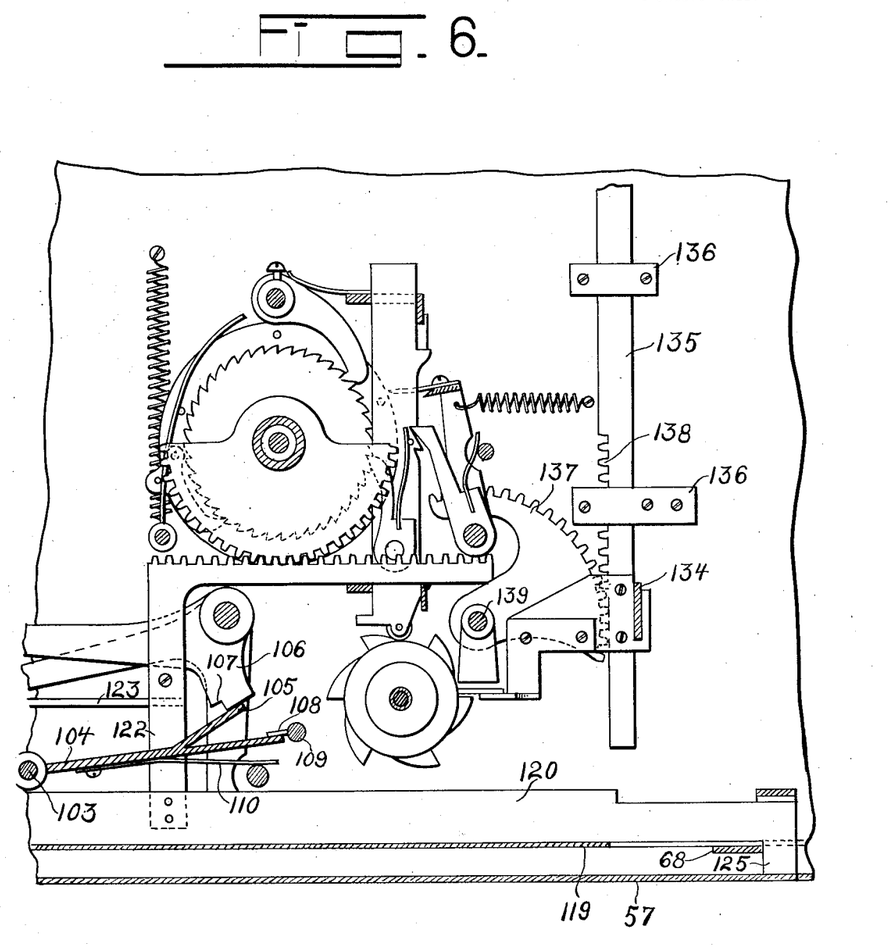
Fig. 6 is a sectional view looking toward the left on a larger scale than Fig. 4, and with parts removed.

On reference to Fig. 2 it will be noticed that the keys are arranged in several sets, those shown being sets for registering different columns of figures, with two additional sets, one for registering an initial, and the other for registering other matters, as for example, "charged, received and paid." The keys are designated according to the matter that they are intended to register. I have provided an error-correcting device for each set of keys, whereby if the wrong key is struck and the error is discovered before the manipulation of the operating bar 90, it can be corrected merely by striking the right key. For this purpose (Figs. 5 and 6) I have shown a rod 103 on which are pivoted a series of plates 104, one plate for each set of keys. Each of these plates is provided with a projection 105, and each of the keys is provided with a projection 106, having a notch 107 adapted to engage the end of the projection 105. All the keys of one section are so arranged as to permit their notches engaging the projection 105, and it will be seen that when a key is depressed these parts register with each other and the key is held temporarily in depressed position. In depressing the keys sufficiently to cause them to be locked in this manner they have to be forced to a point farther down than that at which they remain after being locked. If the wrong key is depressed, the depression of another in the same set will force the plate down to this low point, and will release the key already locked, while retaining the key being depressed and locking that when pressure is removed from it. This provides for the correction mentioned above, and it also prevents the registering or attempted registering of two figures in the same set of keys.

In order to release the keys after the registering operation is entirely completed, the plates 104 project to the rear far enough to be engaged by pins 108 on a rotatable rod 109 which passes across the machine. A spring 110 normally holds each plate in elevated position, but the oscillation of the rod 109 will obviously depress all the plates and unlock all the keys that may be held by them. In order to accomplish this result automatically when the drawer is closed, suitable operating connections are provided for oscillating the rod 109 upon the closing movement of the cash drawer as clearly set forth in detail in the hereinbefore mentioned original application. The operating bar is adapted to engage the right-hand plate 104 when the operating bar is depressed. This feature operates in the same manner as the keys. When the operating bar is released by rocking shaft 109 it ascends and carries the cross-bar 98 into an outward or unlocking position. The keys will then fly up on account of the operation of the springs 93, if the bar 98 is out of engagement with the spaces 97, which will be the case at this time because the operating bar has been raised as described. The keys are therefore in condition to be depressed.

Figure 4:
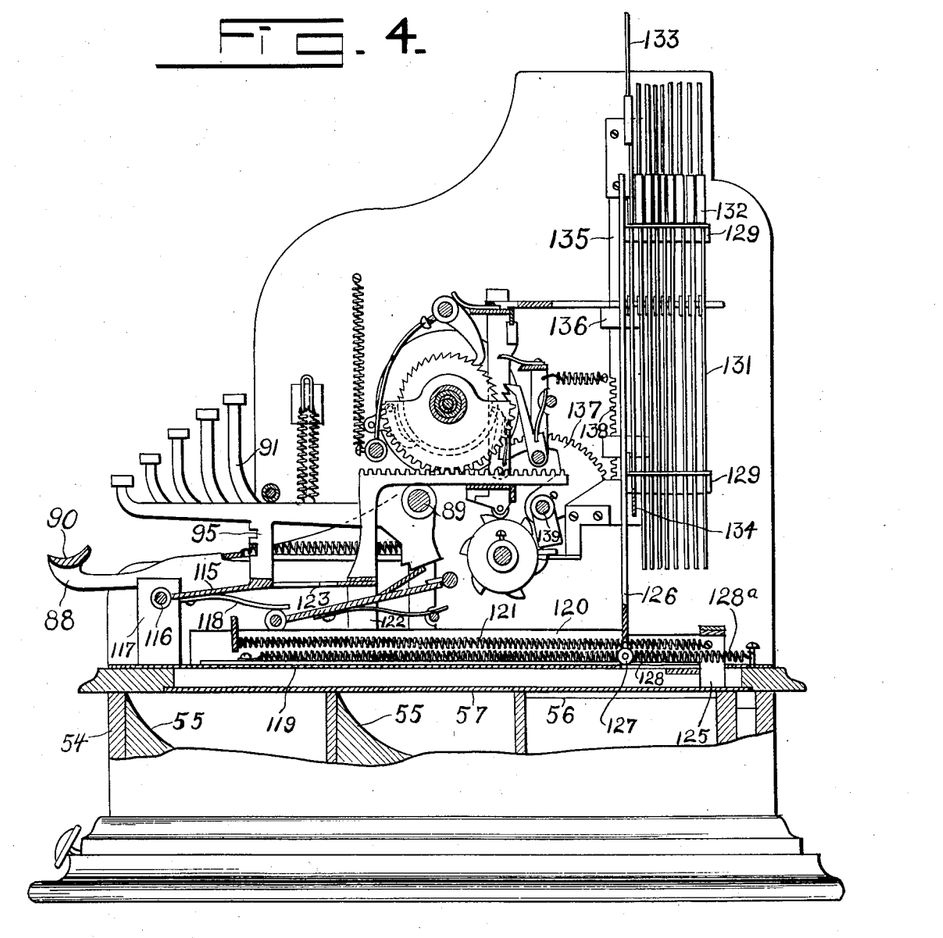
Fig. 4 is a sectional view looking to the left.
Figure 4A:
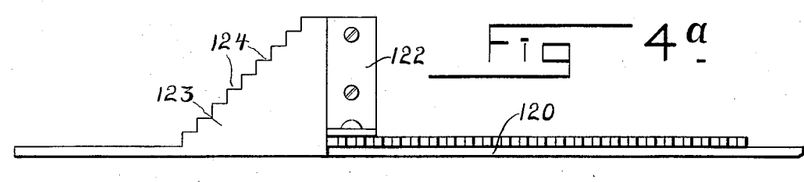

*Indicating device.*—The projections 95 on the keys bear upon plates 115 (Figs. 4 and 5). One of these plates is provided for each of the sections of keys, and they are preferably pivoted upon a rod 116 which is mounted upon a pair of standards 117 constituting a part of the frame. These plates are normally held in elevated position by springs 118 bearing upon the shaft 103 or upon any other convenient part of the machine. Located upon a plate 119 above the table are a series of slides 120 normally urged toward the front of the machine by springs 121 (Figs. 4 and 4ª). The machine is provided with one of these slides for each section of keys, and each slide carries a standard 122 bearing a plate 123 having a series of teeth 124 upon its front edge as shown in Fig. 5. The number of teeth is equal to the number of figures or other characters to be registered in the set to which the plate belongs. The front tooth represents the first character, as for example zero in a set of numbers, the second "1", and so on to "9". When the plate 115 is in elevated position the first step or tooth is against it and the machine is in condition to register zero. When one of the keys is depressed, the end of the plate 115 is removed from the teeth, and the projection 95 upon the key depressed is placed in the path of the plate 123. The keys are so arranged that these depressions are in front of these teeth in regular order. For instance, key No. 1 is directly in front of the tooth which corresponds to the numeral 1 and which represents a single step from the zero key. Consequently when a key is depressed and the slide is permitted to move forward by means to be described, it will move up to such position that the proper tooth will engage the projection on the key which is depressed, and this constitutes a limit for its motion. But when no key of any particular set of keys is depressed, the manipulation of the operating bar will not allow the parts connected with that set to move at all, because the first tooth of the plate 123 of that set is in engagement with the rear of the plate 115.

Each slide 120 is provided (Figs. 4 and 6) with a downwardly extending projection 125 which passes through the plate 119 behind the bar 68. The latter is intended to keep all of the slides 120 in their normal position when the drawer is closed, but when open this bar yields and consequently all the projections 125 are allowed to yield, and are forced to do so by the springs 121, a spring 121ª being employed to operate the slide which is at the right. Upon moving in this way when the drawer opens, these slides will be stopped at a distance of one or more steps from their original position, according to that key which is depressed. Located adjacent to and above each slide is an indicator carriage 126 (Fig. 4) preferably running on wheels 127 in a direction parallel to that of the motion of the slides. Each carriage is provided with a bottom plate 128 which slides upon the top of the plate 119. The rear surfaces of these plates are located in the path of the projections 125 corresponding with the same set of keys, consequently as these projections are drawn forward with their slides by means of the springs 121 and 121ª, they will engage the carriages and move them a distance equal to that which they move themselves. The carriages are impelled toward the rear by springs 128ª. Each of these carriages supports a pair of guides 129, each guide being provided with a series of slots 130 equal in number to the number of keys in the set corresponding to that particular carriage. In these slots are guided a corresponding series of indicator-holders 131. Each of these holders is provided preferably at the top with a casing 132, in which is mounted an indicator 133. These indicators are preferably formed of glass or other transparent material, and the numbers which indicate the transaction to be registered are preferably placed upon the front side, and instead of each number representing the whole number corresponding to that on the key, they are designated in such a manner that the number shown at the front appears in the regular order. In many cash registers as heretofore constructed the indicator corresponding to a number of two figures, as for example "20 cents", bears the numeral "20", and accordingly, when another numeral is rung up, the number appearing on the register does not clearly indicate the amount registered, because in the case of 21 cents the numbers appearing in sight are 20 and 1. In the present case, with the same number, the ordinary figures would appear for the indicator representing 20 cents is supplied merely with the numeral "2". The same principle is carried out throughout the machine.

Figure 3:
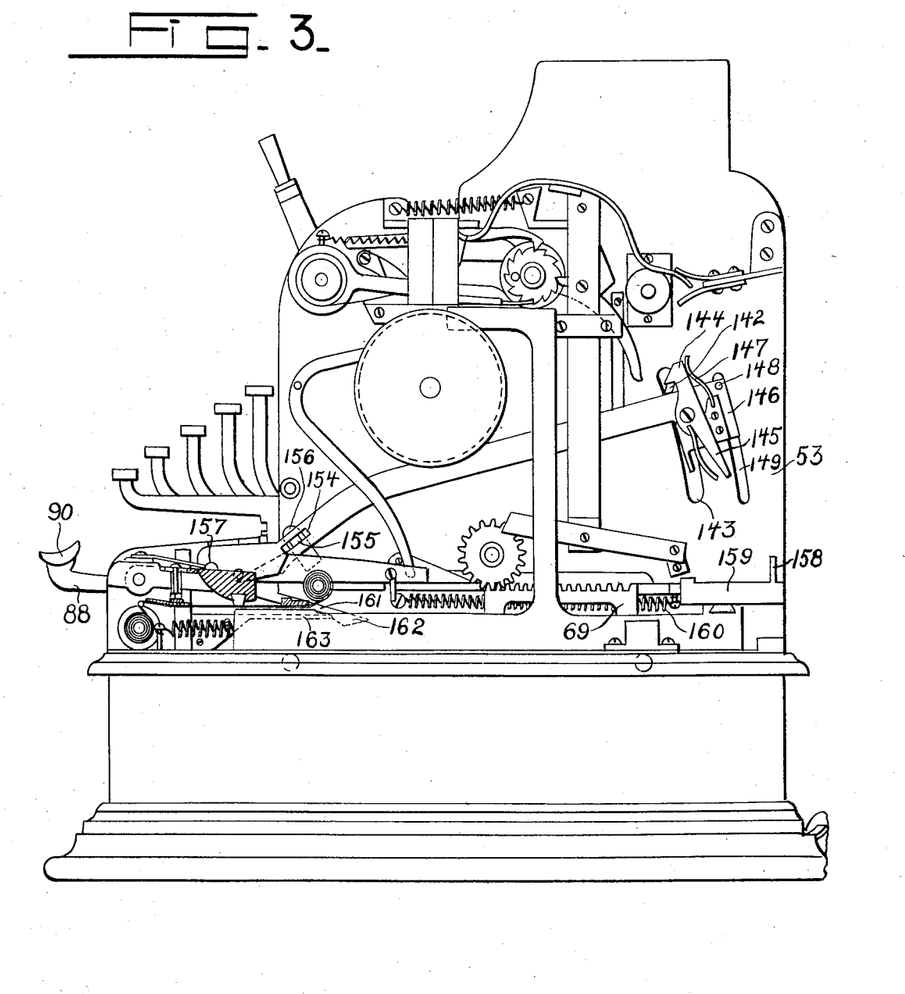
Fig. 3 is an elevation of the right end of the machine without the cover.
Figure 8:
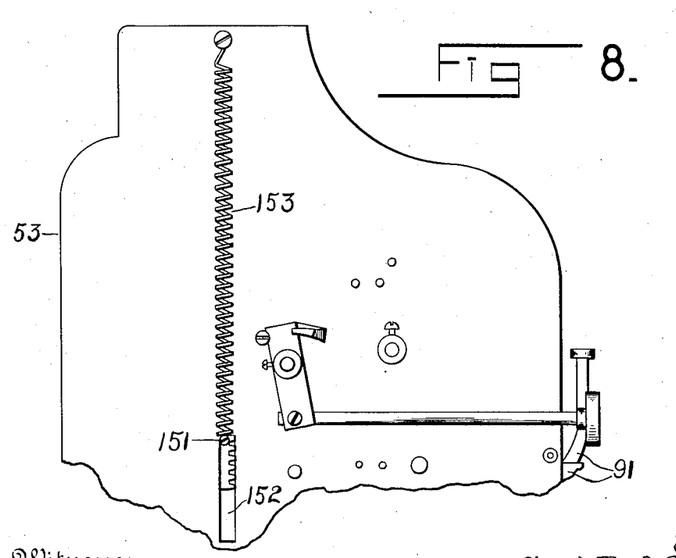
Fig. 8 is a detail view of the indicator elevating bar spring.

It will be readily understood that with the mechanism so far described, the position of the indicators is controlled by the keys, and that there must be a line across the machine which will intersect all of the indicator supports which correspond to the keys depressed, or to the zero keys belonging to those sets in which no number is to be registered. This line is the line directly under the indicator supports of the zero indicators when the latter are in the normal position, and all that is necessary to do in order to move the proper indicators into a more elevated position where they can be seen from the front and back is to place a bar 134 across the machine in a position directly under the original position of the zero indicators, and to raise this bar in such a manner as to elevate all the indicator-holders which are above it and rest upon it. This bar 134 is mounted upon sliding bars 135 (Figs. 4, 5 and 6) guided to move vertically by guides 136 and by guide-segments 137 meshing with racks 138 on the sliding bars and mounted on a shaft 139. In order to manipulate these parts one of the bars 135 is provided with a projection 140 to which is pivoted a connecting rod 141 (Fig. 5). This connecting rod is provided with a stud 142 (Fig. 3). This stud projects through a curved slot 143 on the right-hand side plate 53, and its upper surface is inclined so as to form a good seat for a catch 144 which is mounted upon a lever 145. This lever is pivotally mounted upon a lever 146 pivoted at 157 and is normally held in such a position as to readily engage the stud 142 by a spring 147. The lever 146 is provided with a stud 148, which if desired may extend through a slot 149 in the side plate so as to receive an operating spring 150 which normally holds the lever 146 in elevated position and returns it to that position when displaced. The bar 134 has a stud 151 (Fig. 8) passing through a slot 152 in the left hand side plate 53, and provided with an operating spring 153 for lifting the bar. These parts provide for lifting the bar 134, exposing the indicators which correspond with the keys depressed, and leaving the parts in such position that the catch 144 is free to engage the stud 142.

The lever 146 is provided with an inclined and elongated slot 154 (Fig. 3) through which passes a projection 155 upon one of the operating levers 88. This projection passes through a slot 156 in the side frame, and obviously when the operating bar 90 is depressed it will act upon the lever 146 through the slot 154 to turn it about its pivot 157, and this operation will cause the stud 142 and consequently the bar 134 to be depressed. Therefore, the depression of the operating bar results immediately in the lowering of the indicators which at that time appear in sight, or in other words, the indicators which represent the last sum registered. The withdrawal of the bar 134 below the bottom of the indicator-holders 131 permits them to move with the bars 120 to positions determined by the plates 123, and as the drawer slides open a tripping finger 158 (Fig. 3) which is moved with the drawer engages the lower end of the lever 145 and disengages the catch from the stud 142. This permits the spring to elevate the bar 134 and raises the indicators which correspond to the keys struck. When the operating bar is again raised the lever 146 will be raised with it, and the catch will engage with the stud 142 as before, ready to repeat the operation.

The finger 158 is mounted upon a plate 159 which is normally forced toward the front of the machine by a spring 160 shown in Fig. 3. This plate is provided with a spring or detent 161 having a head 162 thereon, provided with slanting surfaces. A spring 163 engages at the rear of one of these surfaces and normally holds the plate in its position at the rear of the machine, but as the drawer opens, the cam surface 78 (Fig. 5ⁿ) engages the lower side of the head 162, forces it out of reach of the spring 163 and permits the spring 160 to pull the whole plate to the front, when the drawer has reached nearly its outermost position exposing the indicators. This causes the finger 158 to engage with the lever 145. The lever 145 is provided with a spring 164 against which the finger 158 is stopped as long as the lever is in depressed position.

While the form of mechanism herein shown and described is admirably adapted to fulfil the objects primarily stated, it is to be understood that it is not intended to confine the invention to the one form of embodiment herein shown and described, as it is susceptible of embodiment in various forms, all coming within the scope of the claims which follow.

What is claimed is:

1. In a cash register, the combination of an operating element, a lever connected therewith, a catch on the lever, an indicating device comprising a series of vertically movable indicator-holders, a bar located below said holders, means for moving said indicating device so as to bring any desired one of the holders above the bar, means for raising the bar, and means for bringing the catch on said lever into engagement with the bar, whereby the manipulation of the operating means will depress the bar.

2. In a cash register, the combination of an operating bar, a lever connected with said bar so as to be depressed when the operating bar is depressed, a spring-catch upon the lever, an indicating device, and a bar connected with the indicating device and adapted to be engaged by said catch, whereby the operation of said first-named bar will operate the indicating device.

3. A cash register having a pivoted operating bar, a pivoted lever provided with a slot, a projection from said operating bar passing through said slot, a pivoted catch upon the lever, an indicating device and operating connections, and a spring for operating said catch; said catch being provided with a slanting surface whereby it can be made to ride along said connections and engage them when the catch passes beyond the rear surface of the connection.

4. A cash register having a pivoted operating bar, a pivoted lever provided with a slot, a projection from said operating bar passing through said slot, a spring-catch upon said lever, a drawer adapted to be opened when the operating bar is depressed, and means connected with the drawer for engaging said catch and actuating it.

5. In a cash register, the combination of an operating bar, a lever, means connected with the operating bar for depressing the lever, a spring-catch on the lever, resilient means for raising the lever and the operating bar, means for holding the lever and operating bar in depressed position, a drawer, and means for releasing said last-named means when the drawer is closed.

6. In a cash register, the combination of a movable operating bar, a lever connected therewith to be depressed when the operating bar is depressed, means for locking the operating bar and lever in depressed position, resilient means for raising the lever, an indicator, a spring-catch on the lever for engaging said indicator, a drawer, means connected with said drawer for releasing the bar and lever from a depressed position when the drawer is closed, and means connected with the bar for releasing said catch from the indicating device.

7. In a cash register, the combination of a movable operating bar, a lever connected therewith to be depressed when the operating bar is depressed, means for locking the operating bar and lever in depressed position, resilient means for raising the lever, an indicator, a spring-catch on the lever for engaging said indicator, a drawer, means connected with said drawer for releasing the bar and lever from a depressed position when the drawer is closed, and means connected with the bar for releasing said catch from the indicating device; said last-named means comprising a slide adapted to be operated by the movement of the drawer during a part of the motion of the latter.

8. In a cash register, the combination of a movable operating bar, a lever connected therewith to be depressed when the operating bar is depressed, means for locking the operating bar and lever in depressed position, resilient means for raising the lever, an indicator, a spring-catch on the lever for engaging said indicator, a drawer, means connected with said drawer for releasing the bar and lever from a depressed position when the drawer is closed, means connected with the bar for releasing said catch from the indicating device, and a stop on the lever for said last named means.

9. In a machine of the class described, the combination with a plurality of indicators arranged in groups, an actuating device therefor, means for adjusting any desired ones of said groups relative to said actuating device whereby to bring the desired indicators in the same vertical plane and establish a coöperative relation between said device and said desired indicators, and means for operating said device to expose said positioned indicators in said plane and maintain the same in exposed position.

10. In a machine of the class described, the combination with a plurality of vertically movable indicators arranged in groups, an actuating device for said indicators, means for adjusting any desired ones of said groups relative to said actuating device whereby to bring the desired indicators in the same vertical plane and establish a coöperative relation between said device and said desired indicators, and means for operating said device to expose said positioned indicators in said plane and maintain the same in exposed position.

11. In a machine of the class described, the combination with a plurality of indicators mounted in movable frames, of an actuating device common to said indicators, means for adjusting said frames relative to said actuating device whereby to bring the desired indicators in the same vertical plane and establish a coöperative relation between said device and said desired indicators, and means for operating said device to expose the positioned indicators in said plane and maintain the same in exposed position.

12. In a machine of the class described, the combination with movable frames, of groups of vertically movable indicators slidably mounted therein, an actuating device common to all of said indicators, means for adjusting said frame relative to said actuating device whereby to bring the desired indicators in the same vertical plane and establish a coöperative relation between said device and desired ones of said indicators, and means for operating said device to expose said positioned indicators in said plane and maintain the same in exposed position.

13. In a machine of the class described, the combination with a main operating device, of a plurality of indicators mounted in movable frames, of an actuating device common to said indicators, means for adjusting said frame relative to said actuating device whereby to bring the desired indicators in the same vertical plane and establish a coöperative relation between said device and said desired indicators, and means controlled by said main operating device for operating said device to expose the positioned indicators in said plane and maintain the same in exposed position between operations of the main operating device.

14. In a machine of the class described, the combination with a main operating device, of a plurality of indicators mounted in movable frames, of an actuating device common to said indicators, means for adjusting said frames relative to said actuating device whereby to bring the desired indicators in the same vertical plane and establish a coöperative relation between said device and said desired indicators, manipulative devices operable as a preliminary to an operation of the main operating device to determine the extent of adjustment of said frames, and means controlled by said main operating device for operating said device to expose the positioned indicators in said plane and maintain the same in exposed position between operations of the main operating device.

15. In a machine of the class described, the combination with a main operating mechanism, of a plurality of vertically movable indicator slides arranged in groups, connections controlled by said main operating mechanism for adjusting said groups to bring any desired ones of said slides in the same vertical plane, means controlled by said main operating device and having a constant movement in the plane of adjustment of the selected slides, and adapted to engage and move said selected slides to exposed position and maintain the same in exposed position between operations of the main operating device.

16. In a machine of the class described, the combination with a main operating mechanism, of a plurality of vertically movable indicator slides arranged in groups, connections controlled by said main operating mechanism for adjusting said groups to bring any desired ones of said slides in the same vertical plane, manipulative devices operable as a preliminary to an operation of the main operating device to select the desired slides and control the extent of adjustment of said groups, means also controlled by said main operating device and having a constant movement in the plane of adjustment of the selected slides and adapted to engage and move said selected slides to exposed position and maintain the same in exposed position between operations of the main operating device.

17. In a machine of the class described, the combination of a plurality of vertically movable indicator slides arranged in groups, means for adjusting said groups to bring any desired ones of said slides in the same vertical plane, and a single means having a constant movement in the plane of adjustment of the selected slides and adapted to engage and move and maintain said selected slides in exposed position.

18. In a machine of the class described, the combination with a movable cash drawer, of a plurality of groups of indicators, devices controlled by said cash drawer for effecting an adjustment of said groups of indicators, to bring the desired indicators in the same vertical plane, manipulative devices operable to determine the extent of adjustment of said groups, and means common to all of said indicators and controlled by the cash drawer for exposing the selected indicators in said plane and maintaining the same in exposed position between operations of the cash drawer.

19. In a machine of the class described, the combination with a cash drawer, of a plurality of vertically movable indicators arranged in groups, operating devices controlled by the cash drawer for adjusting said groups of indicators to select any desired ones of the same for operation, and means controlled by the cash drawer for elevating the selected indicators and maintaining the same in exposed position between operations of the cash drawer.

20. In a machine of the class described, the combination with a cash drawer, of a plurality of vertically movable indicators arranged in groups, operating devices controlled by the cash drawer for adjusting said groups of indicators to bring the desired indicators in the same vertical plane, manipulative devices operable as a preliminary to an operation of the cash drawer to determine the extent of adjustment of said groups of indicators, and means controlled by said cash drawer for elevating the selected indicators in said plane and maintaining the same in exposed position between operations of the cash drawer.

21. In a machine of the class described, the combination with a cash drawer, of a plurality of vertically movable indicator slides arranged in groups, connections controlled by said cash drawer for adjusting said groups to bring any desired ones of said slides in the same vertical plane, and means controlled by said cash drawer and having a constant movement in the plane of adjustment of the selected slides, and adapted to engage and move said selected slides to exposed position and maintain the same in exposed position between operations of the cash drawer.

22. In a machine of the class described, the combination with a cash drawer, of a plurality of vertically movable indicator slides arranged in groups, connections controlled by said cash drawer for adjusting said groups to bring any desired ones of said slides in the same vertical plane, manipulative devices operable as a preliminary to an operation of the cash drawer to select the desired slides and control the extent of adjustment of said groups and means also controlled by said cash drawer and having a constant movement in the plane of adjustment of the selected slides and adapted to engage and move said selected slides to exposed position and maintain the same in exposed position between operations of the cash drawer.

23. In a machine of the class described, the combination with a movable cash drawer, of a plurality of groups of indicators, devices controlled by said cash drawer for effecting an adjustment of said groups of indicators to select any desired ones of the same for exposure, manipulative devices operable to determine the extent of adjustment of said groups, means common to all of said indicators, and controlled by the cash drawer for exposing the selected indicators and maintaining the same in exposed position between operations of the cash drawer, latching means normally effective to prevent movement of said cash drawer, a special manipulative device for disabling said latching means, and means operated by said special device for effecting a restoration of the exposed indicators to normal position.

24. In a machine of the class described, the combination with a cash drawer, of a plurality of vertically movable indicators arranged in groups, operating devices controlled by the cash drawer for adjusting said groups of indicators to select any desired ones of the same for operation, means controlled by the cash drawer for elevating the selected indicators and maintaining the same in exposed position between operations of the cash drawer, latching means normally effective to prevent movement of said cash drawer, a special manipulative device for disabling said latching means, and means operated by said special device for effecting a restoration of the exposed indicators to normal position.

25. In a machine of the class described, the combination with a cash drawer, of a plurality of vertically movable indicators arranged in groups, operating devices controlled by the cash drawer for adjusting said groups of indicators to select any desired ones of the same for operation, manipulative devices operable as a preliminary to an operation of the cash drawer to determine the extent of adjustment of said groups of indicators, means controlled by said cash drawer for elevating the selected indicators and maintaining the same in exposed position between operations of the cash drawer, latching means normally effective to prevent movement of said cash drawer, and a special manipulative device for disabling said latching means operated by said special device for effecting a restoration of the exposed indicators to normal position.

26. In a cash register the combination with a reciprocatory member, of keys for limiting the movement of the member in one direction, a main operating device for moving the member in the opposite direction, a group of indicators, means controlled by the operating device for exposing any desired one of said indicators and connections intermediate said member and group for giving the latter a movement relative to the exposing means whereby to establish a coöperative relation between said means and any desired one of said indicators.

27. In a cash register the combination with a reciprocatory member, of keys for limiting the movement of the same in one direction, a cash safe having a movable part for moving the member in the opposite direction, a group of indicators, means controlled by said movable part for exposing any desired one of said indicators, and connections intermediate said member and group for giving the latter a movement relative to the exposing means whereby to establish a coöperative relation between said means and any desired one of said indicators.

28. In a cash register the combination with a reciprocatory member, of keys for limiting the movement of the same in one direction, a movable cash drawer adapted to move the member in the opposite direction, a group of indicators, means controlled by said drawer for exposing any desired one of said indicators, and connections intermediate said member and group for giving the latter a movement relative to the exposing means whereby to establish a coöperative relation between said means and any desired one of said indicators.

29. In a cash register the combination with a reciprocatory member, of keys for limiting the movement of the same in one direction, a cash safe having a movable part for moving the member in the opposite direction, a group of indicators, means controlled by said movable part for exposing any desired one of said indicators, and connections controlled by said member for effecting a relative movement of said group and exposing means whereby to establish a coöperative relation between said means and any desired one of said indicators.

30. In a cash register the combination with a reciprocatory member, of keys for limiting the movement of the same in one direction, a movable cash drawer adapted to move the member in the opposite direction, a group of indicators, means controlled by said drawer for exposing any desired one of said indicators, and connections controlled by said member for effecting a relative movement of said group and exposing means whereby to establish a coöperative relation between said means and any desired one of said indicators.

31. In a cash register, the combination with a reciprocatory member, of keys for limiting the movement of the member in one direction, a main operating device for moving the member in the opposite direction, a group of indicators, means controlled by the operating device for exposing any desired one of said indicators, and connections controlled by said member for effecting a relative movement of said group and exposing means whereby to establish a coöperative relation between said means and any desired one of said indicators.

In testimony whereof I affix my signature in the presence of two witnesses.

CARL L. NELSON.

Witnesses:
GEORGE H. DOWLING,
H. McC. BILLINGSLEY.